Figure 1:
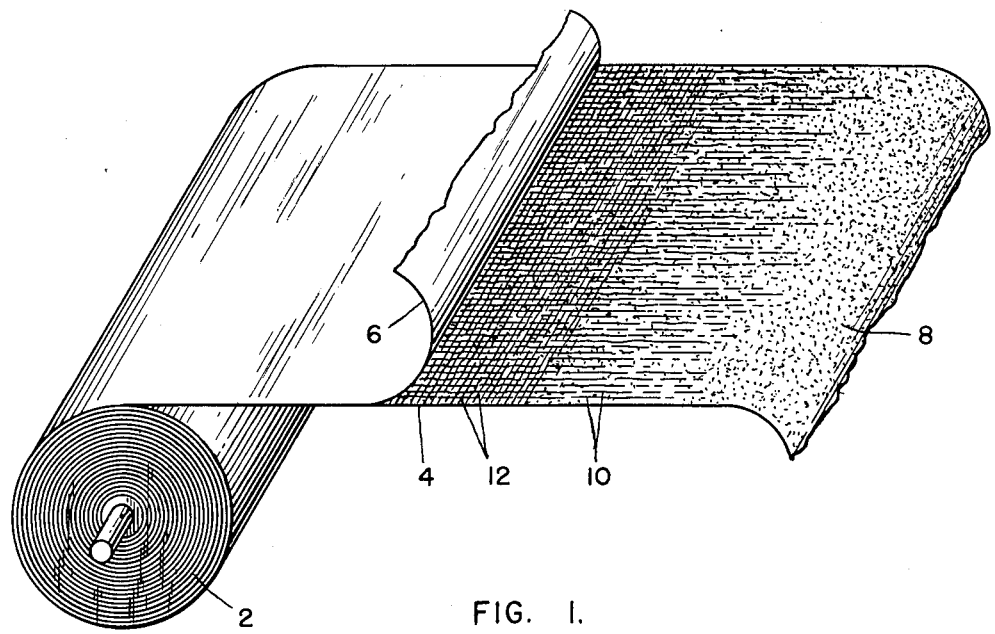

Feb. 28, 1956     F. G. NICKERSON, JR     2,736,679

MANUFACTURE OF LAMINATED MATERIAL

Filed Feb. 16, 1954

INVENTOR
FRANKLIN G. NICKERSON JR.

BY
ATTORNEY

United States Patent Office 2,736,679
Patented Feb. 28, 1956

2,736,679

MANUFACTURE OF LAMINATED MATERIAL

Franklin G. Nickerson, Jr., Attleboro, Mass., assignor to American Sisalkraft Corporation, Attleboro, Mass., a corporation of Delaware Application February 16, 1954, Serial No. 410,728

13 Claims. (Cl. 154—138)

This invention relates to adhesive coated sheets and lamina. It relates particularly to a method of laminating and to a laminating adhesive which produce a superior product while utilizing conventional hot melt apparatus and procedures in the manufacture.

It is conventional, in the manufacture of laminates, such, for example, as a multi-ply paper wrapping material, to use inexpensive thermoplastic adhesives, such as asphalt, so that the fluidity of the adhesive needed for application to the paper is obtained by heating rather than by the use of solvents, and so that solidifying of the adhesive is accomplished simply by cooling. However, a problem with such adhesives is that, in view of their thermoplastic nature, they have an inherent sensitivity to extremes of temperature encountered by the laminates in use in the field. Thus, when the laminate is exposed to summer heat, the adhesive again becomes susceptible to plastic flow, with a consequent tendency to bleed through the paper or edge-bleed by exudation from between the plies. Upon cooling to low temperatures, the laminate, due to hardening of its adhesive component, becomes brittle and is susceptible to cracking when sharply bent.

It is a primary object of this invention to produce a laminate, of paper or other material, secured together by an adhesive which has sufficient fluidity when hot to be applicable by conventional hot melt procedures, but, upon setting, becomes highly resistant to the effects of the widest variations in temperature that may be encountered in the field. The laminate resists edge-bleeding, even at high temperatures; it is very flexible and it retains its flexibility at low temperatures.

The laminating adhesive of the present invention has two principal components. Both of the components are water insoluble. The first component is an elastomer such as natural or synthetic rubber or rubbery polymers which can be made into an aqueous latex. The second component is a tackifier or plasticizer for the elastomer and it is preferably resinous. The elastomer is non-fluid at temperatures of application of the adhesive to the paper under conventional hot melt procedures. The plasticizer, on the contrary, is fluid at these temperatures. These two components of the adhesive are compatible in that they have a mutual solubility sufficient to form a highly viscous gel-like mass. This gel resists plastic flow at high temperature, as desired in the end product, and could not be fluidized at the hot melt temperature.

According to the present invention these separate components of the adhesive are associated, for the purpose of application to the paper or other material in the form of a water-in-oil emulsion having as its continuous phase, the heat fluidized plasticizer and, as its disperse phase, a latex of the elastomer in water. In this fluid emulsion the water shields the elastomer particles from admixture with the heat fluidized resin to inhibit, by its presence, immediate gelation. This emulsion is applied hot at a temperature approaching 212° F. During this initial application stage of the adhesive, before it is set to final form, the adhesive readily flows under the hot application temperatures due both to the flow characteristics of the continuous phase plasticizer when hot and to the water of the elastomeric latex, although there may be some viscosity increase attributable to a slight gelation resulting from agitation of the emulsion during its formation or application to the paper. However, the fine elastomer particles in the water are substantially held separated by the water from the resinous plasticizer as two distinct emulsion phases during hot application of the emulsion to the paper.

After application of the adhesive in hot emulsion form, by coating one or more sheets therewith, the paper plies are combined to form the laminate and the adhesive in emulsion form is tacky so that it secures the paper plies together until the adhesive is set up to its final gel form. This tackiness of the adhesive in its emulsion stage may be, and preferably is, an inherent characteristic of the continuous phase, for which purpose a resinous material may be used as the heat fluidized plasticizer, although there may be some tackiness attributable to the elastomer.

After the paper sheets have so been combined to form the laminate, water of the elastomeric latex is withdrawn from the emulsion, as by absorption by the paper plies. This dehydration is evidenced by an immediate thickening or increase in the viscosity of the adhesive. The loss of water from the emulsion results in the intimate admixture of the elastomer particles and plasticizer so that the solvent action between the plasticizer and the elastomer takes place. Viewed in another way, the elastomer particles form a gel-like structure with the plasticizer. The result is a setting to a gel, forming an adhesive bond of high adhesive and cohesive strength. The adhesive is no longer readily capable of plastic flow at elevated temperature and it is flexible and non-brittle at low temperatures. In the application of the adhesive the desired hot melt practice was employed and no equipment for drying the paper was needed because the amount of water in the latex was negligible in terms of drying procedure or equipment. High fluidity of the adhesive at application temperature was obtained, in spite of the compatibility of its gel-forming components, by the action of the water of the latex in shielding the elastomer particles from mixture with the plasticizer. In effect it is a delayed action adhesive requiring the coaction of the paper in removing water to effect the setting where, as preferred, the paper sheets are combined while the adhesive is still in emulsion form. Alternatively, however, the water may be withdrawn, as by heating the emulsion to set up the gel after coating but before the sheets are combined, and the pressure sensitive characteristics of the gel form of the adhesive are then utilized to secure the sheets together.

Typical elastomers are natural or synthetic rubbers and rubber-like polymers which are not fluidized by heating to 212° F. or preferably at a higher temperature such as 220° F. The synthetic rubber may comprise polychloroprene, copolymers of butadiene with other polymerizable synthetic rubber forming components, for example, butadiene-styrene copolymers, butadiene-acrylonitrile copolymers, and copolymers of isobutylene with butadiene or isoprene, and rubbery vinyl type polymers and copolymers such as polyvinyl esters and polyvinyl acetals which are not fluidized at said temperatures.

The plasticizer component of the adhesive, in contrast to the elastomer, is, as stated, a thermoplastic material capable of being rendered fluid when hot at temperatures approaching 212° F. so that the emulsion may readily be applied to the paper by conventional hot melt procedure and it is preferably a resin in order that the emulsion may have adequate tackiness. It is sufficiently compatible with the elastomer, at least a partial solvent or plasticizer for it so that the desired heat resistant gel formation takes place. That is, if the two components have no mutual solubility, no gel would result and the components would tend to separate out from the adhesive mass. If, on the contrary, the components were completely mutually soluble, the elastomer particles would lose their identity in the homogeneous solution formed and their ability to inhibit flow. As the result, however, of the partial mutual solubility of the elastomer and plasticizer, these two components, upon their admixture following loss of water from the latex, set up to a virtually homogeneous, viscous gelated mass affording a tenaciously bonding adhesive which retains its integrity against separation and its high resistance to flow even at temperatures elevated above that at which the emulsion was applied, and at which the thermoplastic plasticizer would normally flow. The adhesive will not flow at temperatures up to about 220° F. or higher and will not crack or shatter but remains flexible at temperatures as low as 0° F.

The plasticizer is fluid at temperatures approaching but below the boiling point of water, and in the range of 180° to 212° F., it has a viscosity less than 3000 cps., and preferably from 50 to 500 cps. The plasticizer may be a soft viscous fluid even at room temperatures and preferably has a ring and ball softening point in the range of 80° to 130° F.

Various plasticizers having such properties are available from several sources. The plasticizers are desirably select resinous fractions of petroleum, coal or coniferous origin or blends thereof. Thus, a resinous fraction may be obtained from a typically aromatic base crude oil such as a California crude oil which normally contains substantial proportions of aromatics. The resin may be obtained by extraction from a generally heavy resin-containing fraction of the crude oil by any standard petroleum extraction method such as the Duosol process. Alternatively, the resin may be obtained by polymerization of aromatic or unsaturated hydrocarbon fractions derived from any crude petroleum stock. The soft resinous deposit from cracked gasoline available by partial oxidation and polymerization of unsaturated components is a suitable resin. Coal tar oils may also be used as a resin source and resins of the polycoumarone-indene type obtained therefrom by acid or heat polymerization are useful. Alternatively, coniferous resins may be employed such as hard pine resins, such as Vinsol or ester gum, available on the market. Such resins, whether of petroleum, coal or coniferous origin, or blends of any or all of them may be employed for my purposes when selected for the desired compatibility with the elastomer.

Thus various commercial resins of petroleum or coal source such as Dutrex 21 or 22 and Nuso 250 derived from petroleum, or Cumar MH 9, or Cumar AX derived from coal tar and Vinsol hard pine resin desirably pre-softened with a plasticizer such as o-nitrobiphenyl are a few useful examples of resinous plasticizer.

Of these several resins, I prefer the natural petroleum resin Dutrex 21 of which the following table states its empirical characteristics:

| Properties | Dutrex 21 |
|---|---|
| [Physical state—dark, very viscous liquid.] | |
| Softening point, °C.: | |
| ASTM ring and ball | 32.4 |
| Specific gravity, 20° C./4° | 1.051 |
| Pounds per gallon | 8.78 |
| Distillation at 1 mm., °C.: | |
| I. B. P | 187 |
| Dry Point | 311 |
| 50% v | 264 |
| 95% v | 301 |
| Viscosity: | |
| cs. at 210° F | 95.8 |
| Color of 5% sol'n in xylene Gardner | 15 |
| Iodine Number, Wijs, g.l.₂/100 g (1 hr. reaction time) | 105 |
| Iodine Number, Hanus, g.l.₂/100 g (0.5 hr. reaction time) | 77 |
| Av. molecular weight, Ebullioscopic in benzene | 349 |

In selecting elastomers and plasticizers for my purpose, the elastomer, although usually present in minor proportions with relation to the plasticizer, largely determines the essential physical properties of the adhesive gel, such as bond strength, degree of resistance to oil and solvents, bleeding resistance, staining resistance and low temperature flexibility. The plasticizer, usually present in major proportions with relation to the elastomer, provides a large volume of gel having properties characteristic of the elastomer at a cost which is low compared to that of the elastomer.

The proportions of plasticizer to elastomer are preferably 6 parts plasticizer to 1 of elastomer and the specific characteristics of the adhesive described herein are with reference to that proportion. However the proportion is subject to variation and in extreme cases may be in the approximate ratio of 1 to 10 parts of plasticizer to 1 of elastomer solids, that is, about 10% to 100% elastomer solids to plasticizer. As the proportion of elastomer to plasticizer is increased, the adhesive will be less susceptible to plastic flow at high temperatures and will be more flexible at low temperatures.

With regard to the amount of water, the adhesive system in its emulsion phase exists as an "oil-in-water" emulsion of the elastomer solids suspended and dispersed in water to form a latex which in turn is emulsified in the plasticizer. Having determined the relative proportions of elastomer solids and plasticizer within the ranges above specified, the proportion of elastomer latex, a function of the latex concentration, is such that the emulsion system operates as herein described. The concentration of elastomer dry solids in the latex, the balance being largely water, is preferably from about 40% to 65% and the proportion of water to the total volume of emulsion is preferably from about 5% to 25% and specifically around 10% for best results. Where a 65% latex is employed, the range of elastomer solids with respect to the entire emulsion is from about 6% to 33%. In these preferred ranges the amount of water is adequate for the desired fluidity.

The following table shows a preferred adhesive composition:

| | Parts by Weight | Coating Emulsion, percent | Solids on Paper, percent |
|---|---|---|---|
| Plasticizer | 200 | 64.5 | 80.7 |
| Elastomer | 48 | 15.5 | 19.3 |
| Water | 62 | 20.0 | |

As examples of specific formulas, the following are typical:

Lbs.
1. Dutrex 22 _____ 250
   GRS Type 4 (Latex) _____ 100
2. Dutrex 21 _____ 150
   Cumar MH 9 _____ 50
   GRS Type 3 (Latex) _____ 100
3. Dutrex 21 _____ 175
   Ester gum (arochem 351) _____ 25
   GRS Type 6 (latex) _____ 100
4. Cumar AX _____ 200
   Styrone X 580 (latex) _____ 110
5. Dutrex 21 _____ 200
   60% solids heat concentrate of GRS 4 _____ 80
6. Dutrex 21 _____ 200
   RBH 510 _____ 50
   Agerite powder _____ 1
   X-684 (60% solids GRS Cold Latex) _____ 65
   ZnO dispersion 50% solids _____ 1.5
   Methyl Zimate dispersion 50% solids _____ 1.5
   Sulfur dispersion 50% solids _____ 3.0
7. Hycar _____ 15
   o-Nitrobiphenyl _____ 25
   Vinsol _____ 60

| | |
|---|---|
| 8. Hycar | 10 |
| o-Nitrobiphenyl | 26.5 |
| Vinsol | 63.5 |
| 9. Neoprene | 12.8 |
| Dutrex #21 | 62.3 |
| Vinsol | 24.9 |
| 10. Neoprene | 10 |
| Dutrex #21 | 64.3 |
| Vinsol | 25.7 |
| 11. Polyvinyl acetate | 25 |
| Resoflex R–296 | 40 |
| Vinsol | 35 |
| 12. Polyvinyl acetate | 20 |
| Resoflex R–296 | 42.7 |
| Vinsol | 37.3 |

In these formulas the Agerite powder is phenyl beta-naphthylamine, a general purpose rubber antioxidant; RBH Resin 510 is a natural hydrocarbon resin of fossil origin, solvent extracted from a coal bearing deposit near Bauer, Utah, and having a softening point of about 160° C. GRS X–684 is 70% butadiene-30% styrene copolymer emulsified and polymerized at temperatures slightly above freezing, and Resoflex R–296 is a long chain polyester of adipic acid.

As indicated by these specific formulas I preferably employ with the GRS type elastomers a resinous type plasticizer having a substantial aromatic content in the range of from 10% to 75% aromatics. As specific examples, the GRS types of elastomer and especially the GRS types 4, 5, 6 and 7 have proven especially suitable for use with plasticizers of the resinous type derived as fractions taken from a typically aromatic crude oil, containing substantial proportions of aromatics such as 10% to 75%.

The adhesive may be compounded as follows: The latex is placed in a tank and moderately agitated at room temperature and the resin is added to the latex after having first been heated to such an elevated temperature, usually above 300° F. as to produce an equilibrium temperature of the mixture of around 200° F., so that the emulsion forms easily with agitation in the desired temperature range of 180° to 212° F.

As an alternate compounding procedure, the resin in a fluid state and the latex are mixed together in a tank and then heated moderately to the temperature range of 200° to 212° F. with agitation until the emulsion forms.

The emulsion is usually made up at elevated temperature for immediate use while still hot. However, it may be stored and shipped by being poured, while hot, into containers and allowed to cool and solidify, to be subsequently reheated immediately prior to use, as the water is thereby held in situ during storage. While the emulsion is hot, within this temperature range of 180 to 212° F., either immediately after it has been made, or upon being so reheated, it remains adequately fluid for a sufficient period of time, such as 10 minutes, for application by conventional hot melt equipment. Reenforcing fibers, if any, are introduced at a convenient stage prior to uniting of the coated sheets to form the laminate. The fibers, such as sisal or glass, may be laid lengthwise, transversely or otherwise depending upon strength requirements. Equipment for laying such reenforcing is well known in the art and, accordingly, need not be described for an understanding of my invention. To form box stay tape, the laminate is cut into strips with the fibers usually running only crosswise; the top sheet is creped to give greater extensibility laterally of the box cover and the under sheet has a coating of water soluble gum.

Figure 2:
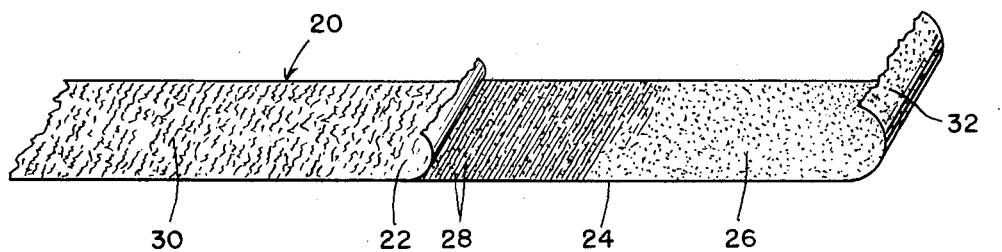

The drawings show typical laminates embodying this invention, of which Fig. 1 is a perspective view of a laminate with its outer plies separated to show the construction and Fig. 2 is a perspective view of a typical box stay tape.

Referring to Fig. 1, the laminate 2 is composed of lower and upper sheets of paper 4 and 6, typically although not necessarily kraft paper. To the upper surface of the lower sheet adhesive 8 comprising an emulsion above described is applied at the temperatures above referred to, after which, in the embodiment shown, longitudinal and transverse fibers 10 and 12 respectively such as sisal or glass are laid on the molten adhesive. Thereafter the uppermost ply 6 of paper is applied with or without an independent coating of the adhesive emulsion and the final product is wound up at 2.

The tape 20 of Fig. 2 has upper and lower plies 22 and 24, the lower ply being coated with the adhesive 26 on which are superimposed fibers 28 extending only transversely. The upper ply 22 which is creped with crepings running in a transverse direction is then applied. For application to the box, the tape is suitably gum coated as at 32.

As a further modification of my invention, the composition may incorporate a rubber which is vulcanized without detracting from the gel formation. Vulcanizing agents are included in the formula of Example 6. In accordance with my invention, I am able to dispense with the use of such protective colloids as starches, soaps, alginates or gelatin, usually present in vulcanizable lattices in amounts adequate to inhibit premature coagulation of the rubber particles in the presence of the vulcanizing agent but which would also have the undesirable effect for my purpose of inhibiting gel formation. I have found that by incorporating the vulcanizing agent into the latex immediately prior to emulsification in the plasticizer, the coagulation is so reduced that the protective colloid conventionally used to prevent it, may be omitted and good gel formation obtained with a vulcanized rubber.

The specific formulations given in the examples above have been selected primarily with a view toward providing a superior adhesive within the limits of practical economy to be used in large quantities for paper lamination as a substitute for the conventional low cost asphalt. But where economy is not a prime objective a wider choice of plasticizer is available for specific requirements, such as color and repellency to solvents, vapors and reaction chemicals encountered in certain uses. Advantage can be taken of variations in compatibility of certain plasticizers with particular elastomers to vary the relative proportions of these components without limitation to the criterion of using a low cost plasticizer in maximum proportions relative to the elastomer to form the gel of desired viscosity characteristics.

Furthermore, although the invention has been described with reference to laminating, the emulsion may be coated on a single sheet of material to become securely adhered to it when set to a gel.

This application is a continuation-in-part of my prior copending application Ser. No. 149,641, now abandoned.

I claim:

1. The method of adhesively securing a ply of sheet material by hot coating with an emulsion convertible to an adhesive gel of inhibited ability to flow at high temperature, which comprises forming a hot water-in-oil emulsion at an elevated temperature not exceeding 212° F. having as its continuous phase an organic plasticizer body thermoflowing at the elevated temperature and, as its disperse phase, an aqueous latex containing in minor proportion with respect to said plasticizer body an organic gelating agent compatible with said plasticizer and selected from the group consisting of natural rubber and synthetic rubbery polymers, non-fluid at said elevated temperature, thereafter coating the ply with said emulsion while hot and subsequently extracting water to set the adhesive to a viscosity, at said elevated temperature, substantially greater than the viscosity of said emulsion.

2. The method of adhesively securing the plies of laminated sheet material by hot coating with an emulsion convertible to an adhesive gel of inhibited ability to flow at high temperature, which comprises forming a hot water-in-oil emulsion in the temperature range of from about 180° to 212° F. having, as its continuous phase, an organic resinous plasticizer body thermoflowing in said temperature range and selected from the group consisting of resins derived from petroleum, resins derived from coal, resins derived from conifer trees, and blends thereof and, as its disperse phase, an aqueous latex containing in minor proportion with respect to said resinous body, an organic gelating agent, compatible with said resinous plasticizer, comprising an elastomeric substance selected from the group consisting of natural rubber and synthetic rubbery polymers, said elastomeric substance being non-fluid in said temperature range, thereafter coating at least one of the plies of the laminate with said emulsion, while hot, and subsequently combining the plies of the laminate with said adhesive and extracting water from the latex to set the adhesive to a viscosity, in said temperature range, substantially greater than the viscosity of said emulsion.

3. The method as defined in claim 2 which includes the step of heating the resinous body prior to admixture with the latex to a temperature sufficient to produce the hot emulsion at a temperature of between 180° to 212° F.

4. The method as defined in claim 2 in which at least one ply of the fibrous sheet material is moisture absorbent paper and the step of extracting the water from the latex is substantially effected by absorption thereof by the paper.

5. The method as defined in claim 2 in which the resinous body comprises a resinous extract of a heavy aromatic base petroleum oil and the rubber latex is a latex of a copolymer of butadiene and styrene.

6. The method as defined in claim 2 in which the resinous body comprises a coumarone-indene resin derived from coal tar and the rubber latex is a latex of a coplymer of butadiene and styrene.

7. The method as defined in claim 2 in which the resinous body is a blend of the resinous extract of a heavy aromatic base petroleum oil and a coumarone-indene resin derived from coal tar and the rubber latex is a latex of a copolymer of butadiene and styrene.

8. The method as defined in claim 2 in which the resinous body is composed in part of a resin derived from conifer trees.

9. An adhesive emulsion adapted to set to an adhesive gel upon application to sheet materials and removal of water, said gel being resistant to flow at temperatures as high as about 220° F., said emulsion being fluid for hot melt application to said sheet materials in the temperature range of from about 180° to 212° F. and consisting essentially of about 6 to 10 parts by weight of a continuous phase water insoluble organic resinous plasticizer body thermoflowing in said temperature range, said resinous plasticizer body being selected from the group consisting of aromatic resinous extracts of heavy aromatic base petroleum oils, coumarone-indene resins and plasticized hard pine resin, said emulsion having as its disperse phase an aqueous latex of 40 to 65% solids content the total solids consisting of about 1 part by weight of an organic gelating agent compatible with said resinous plasticizer resistant to flow in said temperature range selected from the group consisting of natural rubber and synthetic rubbery polymers.

10. A laminated fibrous sheet material containing the laminating adhesive of claim 9.

11. A paper laminate containing a laminating adhesive of claim 9.

12. A box stay tape comprising a laminated fibrous sheet material bonded with an adhesive of claim 9.

13. A fiber reenforced paper laminate bonded with the adhesive of claim 9.

References Cited in the file of this patent

UNITED STATES PATENTS

| | | |
|---|---|---|
| 2,026,194 | Smith | Dec. 31, 1935 |
| 2,054,115 | Abrams et al. | Sept. 15, 1936 |
| 2,382,417 | Hendricks | Aug. 14, 1945 |
| 2,462,029 | Perry | Feb. 15, 1949 |
| 2,504,605 | Thomas | Apr. 18, 1950 |
| 2,511,171 | Mitchell | June 13, 1950 |
| 2,537,190 | Lankau et al. | Jan. 9, 1951 |
| 2,541,689 | Carson | Feb. 13, 1951 |
| 2,606,884 | Mayfield | Aug. 12, 1952 |

FOREIGN PATENTS

| | | |
|---|---|---|
| 453,843 | Great Britain | Sept. 18, 1936 |
| 460,854 | Great Britain | Feb. 1, 1937 |
| 482,833 | Great Britain | Apr. 5, 1938 |